United States Patent
Minkara et al.

(10) Patent No.: US 11,795,104 B2
(45) Date of Patent: Oct. 24, 2023

(54) AGGREGATE MATERIALS AND METHODS OF PREPARATION THEREOF

(71) Applicant: EM RESOURCES LLC, Sourth Jordan, UT (US)

(72) Inventors: Rafic Y. Minkara, Kennesaw, GA (US); Eleazar I. Diaz Loya, Acworth, GA (US); Anupam R. Joshi, Smyrna, GA (US); Hunter D. Culberson, Adairsville, GA (US)

(73) Assignee: EM RESOURCES LLC, South Jordan, UT (US)

( * ) Notice: Subject to any disclaimer, the term of this patent is extended or adjusted under 35 U.S.C. 154(b) by 301 days.

(21) Appl. No.: 17/270,278

(22) PCT Filed: Aug. 22, 2019

(86) PCT No.: PCT/US2019/047705
§ 371 (c)(1),
(2) Date: Feb. 22, 2021

(87) PCT Pub. No.: WO2020/041589
PCT Pub. Date: Feb. 27, 2020

(65) Prior Publication Data
US 2021/0331970 A1 Oct. 28, 2021

Related U.S. Application Data

(60) Provisional application No. 62/721,936, filed on Aug. 23, 2018.

(51) Int. Cl.
*C04B 14/04* (2006.01)
*C04B 7/02* (2006.01)
*C04B 7/12* (2006.01)
*C04B 18/02* (2006.01)
*C04B 18/08* (2006.01)

(52) U.S. Cl.
CPC .............. *C04B 14/044* (2013.01); *C04B 7/02* (2013.01); *C04B 7/12* (2013.01); *C04B 18/021* (2013.01); *C04B 18/08* (2013.01)

(58) Field of Classification Search
CPC ........... C04B 14/044; C04B 7/02; C04B 7/12; C04B 18/021; C04B 18/08; C04B 28/02; Y02W 30/91
See application file for complete search history.

(56) References Cited

U.S. PATENT DOCUMENTS

| 3,765,920 A * | 10/1973 | Humphrey ............. E01C 7/085 106/DIG. 1 |
| 6,802,896 B2 | 10/2004 | Kayali et al. |
| 2012/0216715 A1 | 8/2012 | Boxley et al. |

FOREIGN PATENT DOCUMENTS

| EP | 1801084 A1 | 6/2007 | |
| JP | 2008-239446 A | 10/2008 | |
| KR | 10-0846821 B1 | 7/2008 | |
| KR | 10-2012-0098042 A | 9/2012 | |
| WO | WO 2017/027483 | 2/2017 | |
| WO | WO-2019195862 A1 * | 10/2019 | ............. C04B 14/22 |

OTHER PUBLICATIONS

Agrawal et al. "Characteristic study of geopolymer fly ash sand as a replacement to natural river sand", Construction and Building Materials 150, 681-688 (Year: 2017).*
Indian Standard IS 8112:2013 "Ordinary Portland Cement 43 Grade-Specification". (Year: 2013).*
Wei, Z. et al., "Clinkering-free cementation by fly ash carbonation," *J. CO2 Utilization*, vol. 23, pp. 117-127 (2018).
Metech Inc., "Fly Ash Lightweight Aggregate," Jun. 11, 2015, available at http://www.flyash.info/2015/210-Fan-2015.pdf (71 pages).
Kayali, O., "Flashag—New Lightweight Aggregate for High Strength and Durable Concrete," World of Coal Ash, Apr. 2005 (19 pages).
Shanmugasundaram, S. et al., "Study on Utilization of Fly Ash Aggregates in Concrete," *Modern Applied Science*, vol. 4, No. 5, May 2010.
International Search Report in International Application No. PCT/US2019/047705, dated Dec. 12, 2019 (3 pages).

* cited by examiner

*Primary Examiner* — Anthony J Green
(74) *Attorney, Agent, or Firm* — Hayes Soloway PC (57) ABSTRACT

Aggregates useful in building materials such as concrete are described. The aggregates may include fly ash and an inorganic polymer binder, which may be present as an outer layer on a core of fly ash. Methods of preparing the aggregates and concrete mixtures comprising the aggregates are also described. For example, the aggregates may be prepared by contacting fly ash agglomerates with an alkaline solution. The concrete mixtures may comprise the aggregates and a hydraulic cement.

19 Claims, 4 Drawing Sheets

AGGREGATE MATERIALS AND METHODS OF PREPARATION THEREOF

CROSS REFERENCE TO RELATED APPLICATIONS

This application is the U.S. national phase entry under 35 U.S.C. § 371 of International Application No. PCT/US2019/047705, filed on Aug. 22, 2019, which claims priority to U.S. Provisional Application No. 62/721,936, filed on Aug. 23, 2018, which is incorporated by reference herein in its entirety.

TECHNICAL FIELD

This application generally relates to methods of treating fly ash and compositions and uses thereof. The compositions include aggregates and concrete mixtures including the aggregates.

BACKGROUND

Generally, concrete can be considered a mixture of two components: paste and aggregates. Paste includes cement and water, and may also contain supplementary cementitious materials and admixtures. Aggregates can vary widely in size, shape, and source. The physical and chemical properties of aggregates typically have a strong influence on the properties of a concrete mix and the resulting hardened concrete. For example, the chemical composition, physical shape, and/or size of the aggregates may affect the workability and pumpability of fresh mixed concrete. In hardened concrete, aggregates can influence the resistance to freezing, thawing, wetting, drying, abrasion, or a combination thereof. Aggregates can also influence the skid resistance, wetting, drying, and hydrophobicity of the hardened concrete.

Additionally, the constituent aggregates of a concrete may affect the strength and shrinking/expansion of the concrete, and may affect the rate of deleterious chemical reactions such as alkali-aggregate reactions. The most common type of alkali-aggregate reactions are alkali-silica reactions (ASR). These reactions occur when aggregates comprising silica react with alkali hydroxides in the paste to produce an alkali-silica gel. Alkali-silica gel is prone to expansion, which can lead to cracking and may cause failure of the concrete structure.

Certain mixed composition materials such as fly ash present challenges when incorporated into building materials such as concrete. The pozzolanic properties of fly ash are dependent on the physical interactions between the fly ash and other components of the concrete mixture. An increased calcium content is generally associated with greater hydraulic reactivity of the fly ash. One of the effects of using high calcium fly ash in concrete is increased set time of the resulting concrete. Delayed set times can significantly affect the rate of construction, resulting in added processing/finishing steps, and/or incur a greater regulatory burden. High calcium fly ash, when used in concrete especially at high cement replacement levels, can deleteriously affect the predictability and set times of the resulting concrete.

SUMMARY

The present disclosure includes aggregates, concrete mixtures comprising aggregates, and methods of preparing aggregates. For example, the present disclosure includes aggregates comprising fly ash and an inorganic polymeric binder, where the aggregates comprise calcium, potassium, sodium, lithium, or combinations thereof. For example, the aggregates may comprise calcium and at least one of potassium, sodium, or lithium. In some examples, the aggregates comprise $CaAl_2Si_2O_8$, $NaAl_2Si_2O_8$, $(Ca,Na)Al_2Si_2O_8$, or combinations thereof.

The inorganic polymeric binder may be present in the aggregates in an amount greater than or equal to 2.0 wt. % with respect to the total weight of the aggregates and/or the inorganic polymeric binder may be is present at the surface of the aggregates. For example, the aggregates may comprise a fly ash core at least partially covered by a layer of the inorganic polymeric binder. The layer of the inorganic polymeric binder may have a thickness greater than or equal to 0.75 mm, such as about 0.75 mm to about 2.0 mm. In at least one example, the inorganic polymeric binder comprises a geopolymer. In some examples, the aggregates may have an average particle size of 2 mm to 25 mm. In some examples, the aggregates may expand less than or equal to 0.10% over 16 days, as measured by ASTM C1260. Additionally or alternatively, the aggregates may meet the specifications for concrete aggregates under ASTM C33 (% maximum allowance of weight loss), as measured by ASTM C131.

The aggregates herein may be included in a concrete mixture. For example, the concrete mixture may comprise aggregates as described above or elsewhere herein and a hydraulic cement. In some examples, the aggregates may be present in the concrete mixture in an amount of 35 wt. % to 90 wt. % with respect to the total weight of the concrete mixture. According to some aspects of the present disclosure, the hydraulic cement of the concrete mixture may comprise ordinary Portland cement, fly ash, ground bottom ash, cements containing natural pozzolans, ground granulated blast furnace slag, silica fume, or combinations thereof. The hydraulic cement of the concrete mixture optionally may comprise fly ash. In some examples, the concrete mixture may comprise aggregates and a hydraulic cement comprising fly ash, wherein the concrete mixture has a weight ratio of aggregates to fly ash of 5:1 to 1:1.

Further disclosed herein are methods of preparing aggregates, e.g., aggregates as described above or elsewhere herein. The method of preparing aggregates may comprise contacting fly ash agglomerates with an alkaline solution comprising NaOH, KOH, LiOH, or a salt of an organic acid, wherein the fly ash agglomerates have an average particle size of 2 mm to 25 mm. In some examples, the fly ash agglomerates may comprise greater than or equal to 5 wt. % CaO. Additionally or alternatively, the alkaline solution may comprise from 1 wt. % to 50 wt. % of one or more alkali metal hydroxides. In some examples, the aggregates may be prepared by reacting aluminosilicates and/or calcium from the fly ash with alkalis such as potassium, sodium, and/or lithium. According to some aspects of the present disclosure, the fly ash agglomerates may be contacted with the alkaline solution at a temperature greater than or equal to 25° C. and/or for a time period greater than or equal to 1 hour. The method may further comprise hydrating the fly ash agglomerates before contacting the fly ash agglomerates with the alkaline solution.

Further, for example, the present disclosure includes methods of preparing aggregates for a concrete mixture. The method may comprise hydrating fly ash agglomerates having an average particle size of 2 mm to 25 mm, and contacting the hydrated fly ash agglomerates with an alkaline solution comprising NaOH, KOH, LiOH, or a salt of an organic acid. Contacting the hydrated fly ash agglomerates with the alkaline solution may include submerging the fly ash agglomerates in the alkaline solution at a temperature greater than or equal to 25° C. In some examples, the hydrated fly ash agglomerates may comprise greater than or equal to 5 wt. % CaO.

Other advantages and benefits will be apparent to one skilled in the art when reviewing the specification in combination with the drawings as described herein.

BRIEF DESCRIPTION OF THE DRAWINGS

Embodiments of the present disclosure may be implemented in connection with aspects illustrated in the attached drawings.

DETAILED DESCRIPTION

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. All ranges are understood to include endpoints, e.g., an average particle size between 1 mm and 50 mm includes 1 mm, 50 mm, and all values between.

The present disclosure includes aggregates, methods of preparing such aggregates, and mixtures and compositions thereof. The aggregates may be useful for various building materials, such as concrete. According to some aspects of the present disclosure, the aggregates comprise coal ash, such as fly ash. Aspects of the present disclosure may avoid or otherwise reduce hydraulic reactivity associated with fly ash. In one or more embodiments of the present disclosure, aggregates are prepared by treating (e.g., contacting) fly ash with an alkaline solution.

Coal ash is a category of waste byproducts usually disposed of by coal-burning utilities or other commercial coal-burning facilities. One type of coal ash, fly ash, is a fine-grain heterogeneous material collected by electrostatic precipitation from flue gases. In some embodiments of the present disclosure, the aggregates comprise fly ash. Fly ash can vary in composition, e.g., based on the combustion conditions and composition of the source of coal. Class F fly ash as defined by ASTM C618 has a predominant aluminosilicate phase which may provide pozzolanic properties, while class C fly ash as defined by ASTM C618 have a predominant calcium-alumino-silicate glass phase which may be pozzolanic as well as cementitious. The aggregates herein may comprise and/or be prepared from class F fly ash, class C fly ash, fluidized bed fly ash, and/or other types of fly ash.

The fly ash may comprise calcium, including relatively large amounts of calcium. For example, the fly ash may comprise greater than or equal to about 5 wt. % calcium, such as greater than or equal to about 7 wt. %, greater than or equal to about 10 wt. %, greater than or equal to about 12 wt. %, or greater than or equal to about 15 wt. %. The calcium may be quantified in the form of CaO. For example, the fly ash may comprise greater than or equal to about 5 wt. % CaO, such as about 5 wt. % to about 30 wt. % CaO, about 7 wt. % to about 25 wt. %, about 20 wt. % to about 30 wt. %, or about 10 wt. % to about 20 wt. % CaO.

The fly ash suitable for alkaline treatment according to the methods herein may be in the form of agglomerates and/or aggregates, which may be dry or hydrated. Agglomerates include, for example, a coarse collection of untreated fly ash in the form of loosely coherent particles. Fly ash agglomerates, before undergoing alkaline treatment, may be substantially similar to untreated aggregates. The fly ash may be obtained from a combustion by-product disposal site, such as a dry landfill site or a fly ash pond.

The fly ash optionally may be mechanically processed prior to treatment. For example, fly ash agglomerates optionally may be compacted to form a more tightly adhered material having a desired particle size or particle size distribution. Additionally or alternatively, the agglomerates may be compacted, and then crushed, classified, and/or screened to obtain a desired particle size distribution. In some cases, the fly ash may be obtained as untreated aggregates, e.g., without a compaction step. In at least one example, the fly ash is obtained as aggregates (untreated fly ash aggregates), which may be crushed, classified, and/or screened to achieve a desired particle size or particle size distribution. In some examples, the untreated fly ash aggregates are obtained from a disposal site and are not mechanically processed prior to alkaline treatment.

In the case of dry particles, the fly ash agglomerates or untreated aggregates optionally may be hydrated prior to alkaline treatment. In the case of fly ash agglomerates, for example, the hydration process may bind the particles into a solid mass, which, in some cases, may be excavated, crushed, and/or sieved prior to alkaline treatment. In other examples, the fly ash agglomerates are subjected to alkaline treatment without first being compacted. For example, the alkaline treatment may help to bind the fly ash agglomerates into a solid mass, optionally with a compaction step.

The fly ash agglomerates and/or untreated fly ash aggregates suitable for the methods herein may have an average particle size greater than or equal to about 1 mm, such as greater than or equal to 2 mm or greater than or equal to 5 mm. For example, the fly ash agglomerates and/or untreated fly ash aggregates may have an average particle size of about 1 mm to about 130 mm, such as about 2 mm to about 100 mm, about 2 mm to about 50 mm, about 2 mm to about 25 mm, about 3 mm to about 25 mm, about 5 mm to about 100 mm, about 10 mm to about 50 mm, about 15 mm to about 75 mm, about 20 mm to about 75 mm, about 5 mm to about 40 mm, about 3 mm to about 60 mm, about 7 mm to about 35 mm, about 20 mm to about 40 mm, or about 25 mm to about 50 mm.

As mentioned above, the fly ash may be subjected to alkaline treatment, e.g., by contacting the fly ash with an alkaline solution. The alkaline solution may comprise a strong base and/or a weak base, including conjugate bases. Exemplary alkaline materials suitable for the methods herein include, but are not limited to, alkali hydroxides such as NaOH, KOH, and LiOH, and salts of organic acids such as glycolates, glycerates, malates, propionates, butyrates, lactates, formates, acetates, alginates, and citrates, as well as any combinations thereof. In at least one example, the alkaline solution comprises sodium, such as NaOH.

In some embodiments, the alkaline solution may have an alkali hydroxide content of less than or equal to about 50 wt. %, such as less than or equal to about 25 wt. %, less than or equal to about 10 wt. %, less than or equal to about 7 wt. %, less than or equal to about 5 wt. %, or less than or equal to about 2 wt. %. For example, the alkaline solution may comprise 1 wt. % to 50 wt. % alkali hydroxide, such as about 7 wt. % to about 25 wt. %, or about 5 wt. % to about 15 wt. % alkali hydroxide content.

Any suitable method of contacting the fly ash with the alkaline solution may be used. For example, the fly ash may be submerged in the alkaline solution, belt-coated by the alkaline solution, or coated in a rotary drum containing the alkaline solution, sprayed with the alkaline solution, and/or may be treated by flowing the alkaline solution through a pile or other collection of fly ash agglomerates or aggregates. In some examples herein, the alkaline treatment may be performed under pressure. For example, the fly ash may be contacted with the alkaline solution at elevated pressure, e.g., in an autoclave vessel. The alkaline treatment may be performed at pressures greater than or equal to 200 pounds per square inch (psi), such as, for example, greater than or equal to 250 psi, greater than or equal to 275 psi, or greater than or equal to 300 psi. In some examples, the alkaline treatment is performed at a pressure of 225 psi to 350 psi, such as 250 psi to 325 psi, or 275 psi to 375 psi.

The alkaline treatment may be performed at elevated temperature, e.g., above about 25° C. For example, the alkaline solution may be kept at an elevated temperature when contacting the fly ash. In one or more embodiments, the alkaline solution may be at a temperature greater than or equal to about 25° C., greater than or equal to about 30° C., greater than or equal to about 50° C., greater than or equal to about 60° C., greater than or equal to about 70° C., or greater than or equal to about 85° C. In one or more embodiments, the fly ash may be treated for longer than or equal to about 1 hour, such as, for example, longer than or equal to about 24 hours or longer than or equal to about 72 hours, e.g., a period of time of about 1 hour to about 120 hours, about 1 hour to about 72 hours, about 1 hour to about 48 hours, about 1 hour to about 24 hours, about 1 hour to about 12 hours, about 1 hour to about 6 hours, about 12 hours to about 24 hours, about 24 hours to about 48 hours, or about 36 hours to about 72 hours.

According to some aspects of the present disclosure, the alkaline solution may be recirculated to treat more than one batch of aggregates, e.g., two, three, or more batches. For example, after an alkaline treatment, a portion of the alkali species may react and bind within the aggregates, while the rest of the alkali species remains in the alkaline treatment solution. The alkaline treatment solution optionally may be recovered, and then replenished (e.g., by addition of alkaline species) to adjust the chemical concentration of the alkaline treatment solution for treatment of subsequent batches. For example, alkaline species may be added to the recovered alkaline treatment solution to increase the alkaline concentration, e.g., so as to produce approximately the same concentration as the original concentration of the alkaline treatment solution. The replenished alkaline treatment solution thus may be utilized to treat aggregates as described herein. In some aspects, before replenishing a recovered alkaline solution may include alkaline species in an amount less than or equal to about 20 wt. %, less than or equal to about 50 wt. %, less than or equal to about 75 wt. %, less than or equal to about 90 wt. %, or less than or equal to about 99 wt. % of the alkaline species present in the original alkaline treatment solution. After replenishing, the recovered alkaline treatment solution may include alkaline species in an amount approximately equal (±5%) to the amount present in the original alkaline treatment solution.

Following the alkaline treatment, the aggregates (prepared from fly ash agglomerates or untreated fly ash aggregates) may have an average particle size greater than or equal to about 1 mm, such as greater than or equal to 2 mm or 5 mm. For example, the aggregates may have an average particle size of about 1 mm to about 130 mm, such as about 2 mm to about 100 mm, about 2 mm to about 50 mm, about 2 mm to about 25 mm, about 3 mm to about 25 mm, about 5 mm to about 100 mm, about 10 mm to about 50 mm, about 15 mm to about 75 mm, about 20 mm to about 75 mm, about 5 mm to about 40 mm, about 3 mm to about 60 mm, about 7 mm to about 35 mm, about 20 mm to about 40 mm, or about 25 mm to about 50 mm. In some examples, the aggregates may have substantially the same size as the untreated fly ash (fly ash agglomerates or untreated fly ash aggregates).

The aggregates may have a specific gravity of 2.0 to 3.0, such as 2.0 to 2.5, 2.3 to 2.7, 2.5 to 3.0, 2.2 to 2.6. Additionally or alternatively, the aggregates may have a bulk density of 0.4 $g/cm^3$ to 1.2 $g/cm^3$, such as 0.5 $g/cm^3$ to 1.0 $g/cm^3$, 0.7 $g/cm^3$ to 1.1 $g/cm^3$, 0.5 $g/cm^3$ to 0.7 $g/cm^3$, or 0.6 $g/cm^3$ to 1.2 $g/cm^3$. Further, for example, the aggregates may have a surface area of 6 $m^2/g$ to 10 $m^2/g$, such as 8 $m^2/g$ to 10 $m^2/g$, or 7.5 $m^2/g$ to 9.0 $m^2/g$, or 8.0 $m^2/g$ to 8.5 $m^2/g$. In some examples, the alkaline treatment may result in a decrease in specific gravity and/or density of the fly ash while increasing surface area of the fly ash. This may be beneficial in producing low-density (or lower density) materials for some applications.

In one or more embodiments, the aggregates may have a BET surface area equal to or greater than 8.00 $m^2/g$, or equal to or greater than 8.10 $m^2/g$, or equal to or greater than 8.20 $m^2/g$.

In one or more embodiments, the aggregates may have an amorphous content equal to or less than 90 wt. %, or equal to or less than 88 wt. %, or equal to or less than 86 wt. %, based on the total weight of the aggregates. For example, the aggregates may have an amorphous content of 50 wt. % to 90 wt. %, such as 60 wt. % to 86 wt. %, or 70 wt. % to 84 wt. %.

In one or more embodiments, an inorganic polymer binder may be formed during the treatment. The inorganic polymer binder may comprise, e.g., a geopolymer. For example, inorganic polymer (e.g., geopolymers) may form from aluminosilicates in fly ash reacting with one or more alkali metals present in an alkaline solution during treatment of the fly ash. The inorganic polymers may form at the surface of the fly ash, e.g., the polymers comprising alkali-aluminosilicate bonds with greater mechanical strength than the bonds of the aluminosilicates. The term geopolymer includes crystalline phase materials that form from aluminosilicates present in the fly ash reacting with one or more alkali metals in the alkaline treatment solution, such as, for example, an alkali activated aluminosilicate glass. The inorganic polymer binder may comprise aluminosilicates, calcium (e.g., from the fly ash and/or the alkaline treatment solution), and/or alkali metals such as potassium, sodium, lithium, or combinations thereof. Thus, for example, in some embodiments, the inorganic polymer binder comprises a geopolymer that comprises aluminosilicates in combination with calcium (e.g., from CaO of the fly ash) and/or one or more species present in the alkaline solution (e.g., sodium, potassium, and/or lithium). For example, alkali metals from the alkaline solution may form anorthite-like complexes with calcium in the fly ash. In some embodiments, anorthite complexes may comprise calcium and/or sodium complexed in a three-dimensional alumina-silicate grid at a formulation of $CaAl_2Si_2O_8$ (anorthite), $NaAl_2Si_2O_8$, $(Ca,Na)Al_2Si_2O_8$, or combinations thereof. In at least one example, one or more species from the alkaline solution may be incorporated into the alumina-silicate-calcium complex to form geopolymers. In at least one example, the alkaline solution comprises sodium, potassium, and/or lithium, and the geopolymers comprise alkali modified aluminosilicates, wherein the alkali consists of or consists essentially of calcium and at least one of sodium, potassium, or lithium in anorthite-like complexes. Thus, in one or more embodiments, the aggregates may include calcium, sodium, potassium, and/or lithium in an amount equal to or greater than 3 wt. %, equal to or greater than 5 wt. %, or equal to or greater than 7 wt. % based on the total weight of the aggregates. For example, the aggregates may comprise calcium, sodium, potassium, and/or lithium in an amount of 3 wt. % to 10 wt. %, such as 5 wt. % to 9 wt. % based on the total weight of the aggregates.

As mentioned above, the inorganic polymer binder (e.g., geopolymers) may be formed along the surface of the fly ash. For example, as the alkaline solution contacts the exterior of the fly ash during the alkaline treatment, a continuous or discontinuous geopolymer layer may be formed along the exterior of the particles. The inorganic polymer binder layer (e.g., geopolymer layer) may at least partially cover a fly ash core. The layer may have a thickness greater than or equal to about 0.5 mm, such as greater than or equal to about 0.75 mm, greater than or equal to about 1.0 mm, greater than or equal to about 1.5 mm, or greater than or equal to about 2.0 mm. For example, the layer may have a thickness of about 0.75 mm to about 1.5 mm, e.g., about 1.0 mm to about 1.5 mm, or about 1.0 mm to about 2.0 mm.

In some cases, the formation of inorganic polymer binder (e.g., geopolymers) may correspond to an increase in mass. For example, the aggregates may gain up to 15 wt. %, up to 10 wt. %, or up to 5 wt. % following the alkaline treatment, as compared to the untreated fly ash (fly ash agglomerates or untreated fly ash aggregates).

In one or more embodiments, the aggregates may include bound water in an amount equal to or greater than 4 wt. %, or equal to or greater than 5 wt. %, or equal to or greater than 7 wt. % based on the total weight of the aggregates.

In some embodiments, aggregates comprise greater than or equal to about 2 wt. % inorganic polymer binder, with respect to the weight of the aggregates, such as greater than or equal to about 5 wt. %, greater than or equal to 10 wt. %, greater than or equal to 15 wt. %, or greater than or equal to 20 wt. % inorganic polymer binder. In some examples, the aggregates comprise about 2 wt. % to about 30 wt. % inorganic polymer binder, such as about 3 wt. % to about 20 wt. %, or about 5 wt. % to about 15 wt. %, e.g., a inorganic polymer binder content of about 2 wt. % about 5 wt. %, about 7 wt. %, about 10 wt. %, about 12 wt. %, about 15 wt. %, about 18 wt. %, or about 20 wt. %.

According to some aspects of the present disclosure, the aggregates comprise greater than or equal to about 2 wt. % geopolymer, with respect to the weight of the aggregates, such as greater than or equal to about 5 wt. %, greater than or equal to 10 wt. %, greater than or equal to 15 wt. %, or greater than or equal to 20 wt. % geopolymer. In some examples, the aggregates comprise about 2 wt. % to about 30 wt. % geopolymer, such as about 3 wt. % to about 20 wt. %, or about 5 wt. % to about 15 wt. %, e.g., a geopolymer content of about 2 wt. % about 5 wt. %, about 7 wt. %, about 10 wt. %, about 12 wt. %, about 15 wt. %, about 18 wt. %, or about 20 wt. %.

The aggregates prepared according to the methods herein may be suitable for use in concrete. For example, the aggregates may be combined (optionally with other aggregate materials) with cement and water to form a concrete. The aggregates herein may exhibit reduced expansion when used in concrete. For example, the aggregates may expand less than or equal to 0.15% over 16 days, as measured by ASTM C1260, such as less than or equal to 0.14%, less than or equal to 0.13%, less than or equal to 0.12%, less than or equal to 0.11%, less than or equal to 0.10%, less than or equal to 0.09%, or less than or equal to 0.08% over 16 days, as measured by ASTM C1260. Additionally or alternatively, the aggregates may meet the specifications for concrete aggregates under ASTM C33 (% maximum allowance of weight loss), as measured by ASTM C131.

Thus, also disclosed herein are concrete mixtures comprising aggregates and a hydraulic cement, wherein the aggregates comprise fly ash and a geopolymer, e.g., as discussed above. The concrete mixture may comprise aggregates that include a fly ash core and geopolymers at and/or proximate the surface of the aggregates. In some examples, the aggregates are present in the concrete mixture in an amount of about 35 wt. % to about 90 wt. % with respect to the total weight of the concrete mixture, such as about 45 wt. % to about 85 wt. %, or about 50 wt. % to about 75 wt. %.

Exemplary hydraulic cements include, but are not limited to, ordinary Portland cement, fly ash, ground bottom ash, cements containing natural pozzolans, ground-granulated blast furnace slag, silica fume, or combinations thereof. For example, the concrete mixture may comprise an untreated fly ash, wherein the weight ratio of the aggregates to the untreated fly ash is about 10:1 to about 1:1, such as about 5:1 to 1:1 or about 3:1 to 1:1. The fly ash used in the hydraulic cement may have an average particle size less than or equal to 1 mm, such as, for example, less than or equal to about 0.5 mm, less than or equal to about 0.1 mm, or less than or equal to about 0.01 mm.

Without intending to be bound by theory, it is believed that that the aggregates prepared according to the methods herein, e.g., with alkaline treatment, provide for concrete materials with improved strength and/or durability. For example, the aggregates herein may have increased resistance to abrasion, resistance to impact, and/or resistance to grinding, as compared to untreated fly ash aggregates. Further, for example, the aggregates herein may be less susceptible to ASR and/or capable of mitigating ASR when used in combination with ASR-prone aggregates, such as aggregates that comprise silica.

In some embodiments, the cement mixture comprises fly ash treated by an alkaline solution. Concretes prepared from aggregates that comprise geopolymers and hydraulic cement comprising fly ash treated with an alkaline material may have certain benefits. For example, the aggregates and treated fly ash may provide for a synergistic effect, e.g., such that the concrete is less prone to ASR without a deleterious increase in set time.

Concrete prepared from the concrete mixtures herein may comprise about 60 wt. % to about 90 wt. % of the treated aggregates, such as about 65 wt. % to about 85 wt. %, about 70 wt. % to about 85 wt. %, or about 65 wt. % to about 80 wt. %. In some embodiments, all aggregates within the concrete mixture may be treated with an alkaline solution as described herein. In other embodiments, the concrete mixture may comprise a combination of treated and untreated aggregates, e.g., aggregates treated with an alkaline solution as described herein and untreated aggregates comprising one or more of fly ash, sand, gravel, or crushed stone. The concrete mixture may have a weight ratio of treated aggregate to untreated aggregate of 1:10 to 10:1, such as, for example, 1:5 to 5:1, 1:3 to 3:1, 1:2 to 2:1, or 1:1. In some examples, the weight ratio of treated aggregate to untreated aggregate in the concrete mixture is 3:1 to 10:1, such as 5:1 to 7:1.

According to some aspects of the present disclosure, the aggregates of the concrete mixture may comprise greater than or equal to 25 wt. %, greater than or equal to 50 wt. %, or greater than or equal to 75 wt. % aggregates comprising fly ash and a geopolymer, with respect to the total weight of aggregates in the concrete mixture. For example, the concrete mixture may comprise about 75 wt. % to about 100 wt. %, about 50 wt. % to about 95 wt. %, about 65 wt. % to about 95 wt. %, or about 90 wt. % to about 100 wt. % aggregates comprising fly ash and a geopolymer, with respect to the total weight of aggregates in the concrete mixture.

EXAMPLES

The following examples are intended to illustrate the present disclosure without being limiting in nature. It is understood that the present disclosure encompasses additional aspects and embodiments consistent with the foregoing description and following examples.

Example 1

Fly ash aggregates of three different size distributions (Grade A, Grade C, and Grade D) were treated with NaOH and then analyzed and compared to untreated fly ash aggregates. The size distributions of the aggregates are summarized in Table 1 below.

TABLE 1

| | | Grade | | |
|---|---|---|---|---|
| Passing | Retained on | A | C | D |
| 37.5 mm (1½ in.) | 25 mm (1 in.) | 25% | 0 | 0 |
| 25.0 mm (1 in.) | 19.0 mm (¾ in.) | 25% | 0 | 0 |
| 19.0 mm (¾ in.) | 12.5 mm (½ in.) | 25% | 0 | 0 |
| 12.5 mm (½ in.) | 9.5 mm (⅜ in.) | 25% | 0 | 0 |
| 9.5 mm (⅜ in.) | 6.3 mm (¼ in.) | 0 | 50% | 0 |
| 6.3 mm (¼ in.) | 4.75 mm (No. 4) | 0 | 50% | 0 |
| 4.75 mm (No. 4) | 2.36 mm (No. 8) | 0 | 0 | 100% |

Two samples of Grade A aggregates (A1 and A2), two samples of Grade C aggregates (C1 and C2), and three samples of Grade D aggregates (D1-D3) were submerged in NaOH solutions of varying concentrations at 60° C. for 72 hours. One sample of Grade C aggregates (C3) was submerged in 3.5 wt. % NaOH for 2 hours in an autoclave a temperature of 60° C. and a pressure of 275 psi. The treated aggregates were then removed from the alkaline solution, washed with water, and dried. The chemical compositions of the alkaline-treated aggregates and a sample of Grade D untreated aggregates were analyzed by X-ray fluorescence (XRF) as summarized in Table 2.

TABLE 2

| | | Grade A | | Grade C | | | Grade D | | |
|---|---|---|---|---|---|---|---|---|---|
| | Untreated | A1 | A2 | C1 | C2 | C3 | D1 | D2 | D3 |
| NaOH treatment (wt. %) | — | 6.8 | 25 | 6.8 | 50 | 3.5 | 3.5 | 6.8 | 50 |

| % wt. | Untreated | A1 | A2 | C1 | C2 | C3 | D1 | D2 | D3 |
|---|---|---|---|---|---|---|---|---|---|
| $SiO_2$ | 48.55 | 46.67 | 46.08 | 46.46 | 42.3 | 47.17 | 47.69 | 46.8 | 41.16 |
| $Al_2O_3$ | 15.22 | 15.07 | 14.6 | 15.15 | 14.12 | 15.28 | 15.09 | 15.19 | 14.27 |
| $Fe_2O_3$ | 7.74 | 7.78 | 7.1 | 7.83 | 7.48 | 7.99 | 7.67 | 7.83 | 7.72 |
| $SO_3$ | 1.11 | 1.09 | 1.01 | 0.76 | 1.09 | 0.94 | 0.84 | 0.73 | 1.06 |
| CaO | 15.08 | 15.18 | 13.57 | 15.47 | 14.6 | 15.61 | 15.511 | 15.29 | 14.71 |
| $Na_2O$ | 2.68 | 4.47 | 8.54 | 4.93 | 11.61 | 3.10 | 3.54 | 4.87 | 12.36 |
| MgO | 4.65 | 4.6 | 4.23 | 4.71 | 4.25 | 4.84 | 4.73 | 4.68 | 4.31 |
| $K_2O$ | 2.07 | 2.00 | 1.97 | 1.97 | 1.55 | 2.04 | 1.98 | 1.94 | 1.41 |
| NaOH uptake | — | 2.31 | 7.56 | 2.91 | 11.52 | 0.55 | 1.11 | 2.83 | 12.48 |

As is shown in Table 2, the sodium content ($Na_2O$) of the treated aggregates was higher than that measured for the untreated aggregates. The increase in sodium content is attributed to the formation of Na-bearing reaction products. Visual inspection of cross-sections of the treated aggregates showed a darkened crust formed on the exterior of the aggregates. This is attributed to a geopolymer layer of about 2 mm thickness surrounding the fly ash core. The results also show that, the mass of the treated aggregates increased by as much as 10% following treatment, indicative of newly formed reaction products.

Figure 1A:
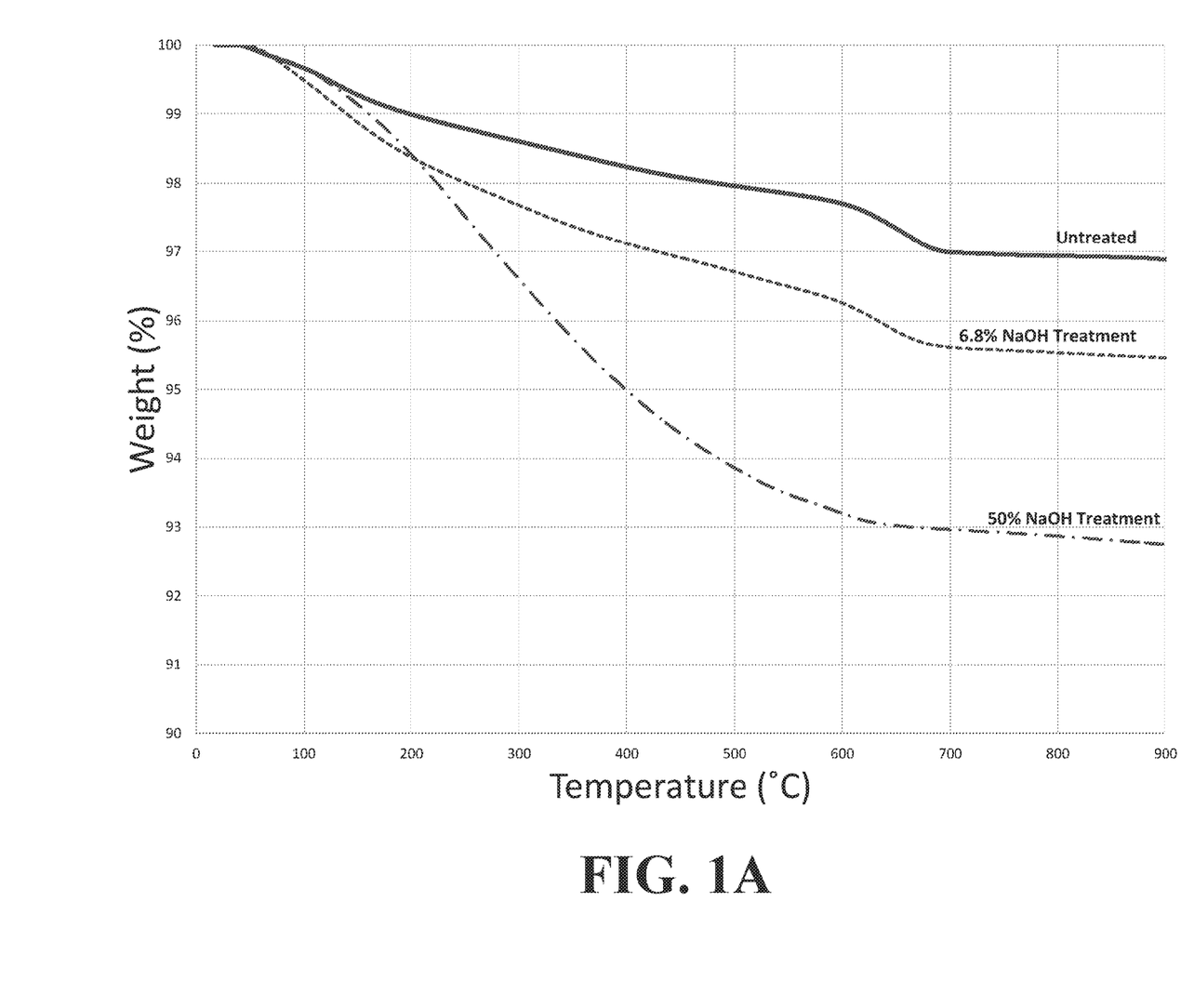
FIGS. 1A-1B are graphs from thermogravimetric analysis of untreated and treated aggregates, as discussed in Example 1.
Figure 1B:
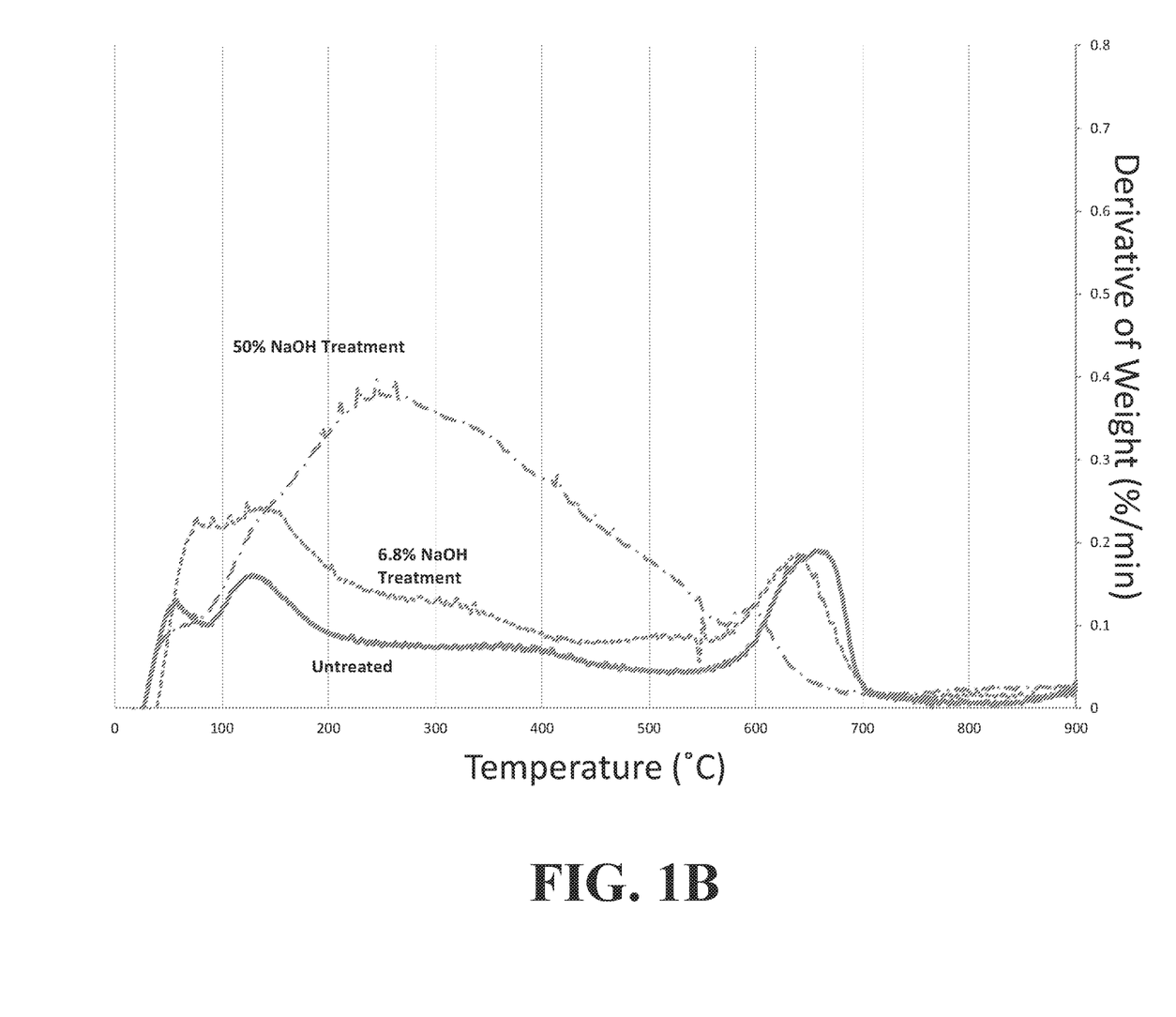

Samples D1 and D3 (aggregates treated with 6.8 wt. % and 50 wt. % NaOH, respectively) were also subjected to thermogravimetric analysis and compared to the Grade D untreated aggregates. The weight loss curves are shown in FIG. 1A, while their derivatives are shown in FIG. 1B. As can be seen in FIG. 1A, sample D3 treated with 50 wt. % NaOH lost the most weight during the heat curve, and the treated samples D1 and D3 lost more weight than the untreated aggregate. This is believed to be due to water bound by the reaction products formed during the alkaline treatment.

Figure 2:
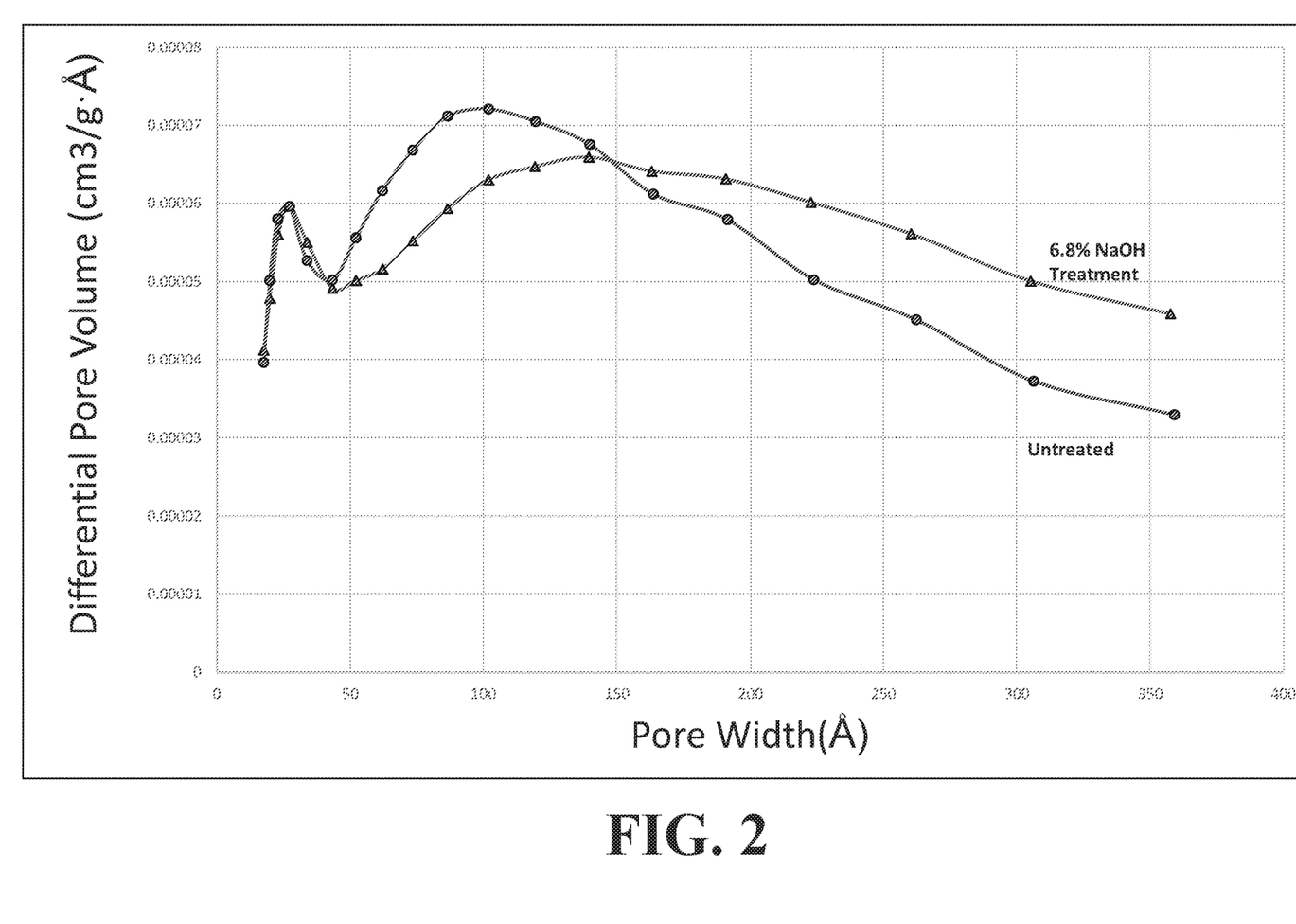
FIG. 2 is a graph of pore size distribution of untreated and treated aggregates, as discussed in Example 1.

The pore size distribution of sample D2 before and after NaOH treatment was calculated by the Barrett-Joyner-Halenda method with the results shown in FIG. 2. The treated aggregates were found to have a smaller volume of pores in the 5-15 nm range and a higher volume of pores in the 15-35 nm range, as compared to the untreated aggregates. This suggests that the reaction products generated during the alkaline treatment have a higher content of the larger sized pores, thus reducing the density of the aggregate.

Additionally, Table 3 shows the specific gravity and Braunauer-Emmett-Teller (BET) surface area calculated for the D2 sample before and after NaOH treatment. The treated aggregates were found to have a lower specific gravity and a greater BET surface area, as compared to the untreated aggregates.

TABLE 3

| Sample | Specific Gravity | BET Surface Area ($m^2/g$) |
| --- | --- | --- |
| Untreated Grade D | 2.66 | 7.99 |
| D2 after NaOH treatment | 2.52 | 8.45 |

Further, quantitative X-ray diffraction analysis was performed to compare untreated aggregates with sample D1 (treated with 3.5 wt. % NaOH) and sample D2 (treated with 6.8 wt. % NaOH). The results of the X-ray diffraction analysis are summarized in Table 4. The alkaline treatment is believed to promote the formation of anorthite, which was not observed in the untreated aggregate.

TABLE 4

| Phases Observed (wt. %) | Untreated | D1 | D2 |
| --- | --- | --- | --- |
| Amorphous | 92.53 | 84.07 | 82.36 |
| Quartz ($SiO_2$) | 4.02 | 6.03 | 3.68 |
| Anorthite ($[Ca,Na]Al_2Si_2O_8$) | 0 | 2.12 | 9.61 |
| Hematite ($Fe_2O_3$) | 6.10 | 4.15 | 1.47 |
| Calcite ($CaCO_3$) | 0.80 | 0.32 | 0.14 |
| Periclase (MgO) | 0.57 | 0.76 | 1.34 |
| Ettringite ($Ca_6Al_2(SO_4)_3(OH)_{12} \cdot 26H_2O$) | 0.95 | 0.55 | 0.31 |

It is believed that the reaction products included geopolymers comprising sodium aluminosilicate hydrates, which may include anorthite type geopolymers containing sodium.

Example 2

Several samples of NaOH-treated aggregates (samples A1, C1-C3, D2, and D3) were subjected to abrasion testing according to ASTM C131 (LA abrasion) as compared to untreated aggregates. A sample of Grade C aggregates that had been treated with water at a temperature of 60° C. for 72 hours was also tested. The results are reported in Table 5 below as compared to the specifications for concrete aggregates under ASTM C33 (% maximum allowance of weight loss).

As can be seen in Table 5, the untreated aggregates failed to meet the abrasion requirement stipulated in ASTM C33 when measured by ASTM C131. By contrast, all of the treated aggregate samples met the specifications.

Figure 3:
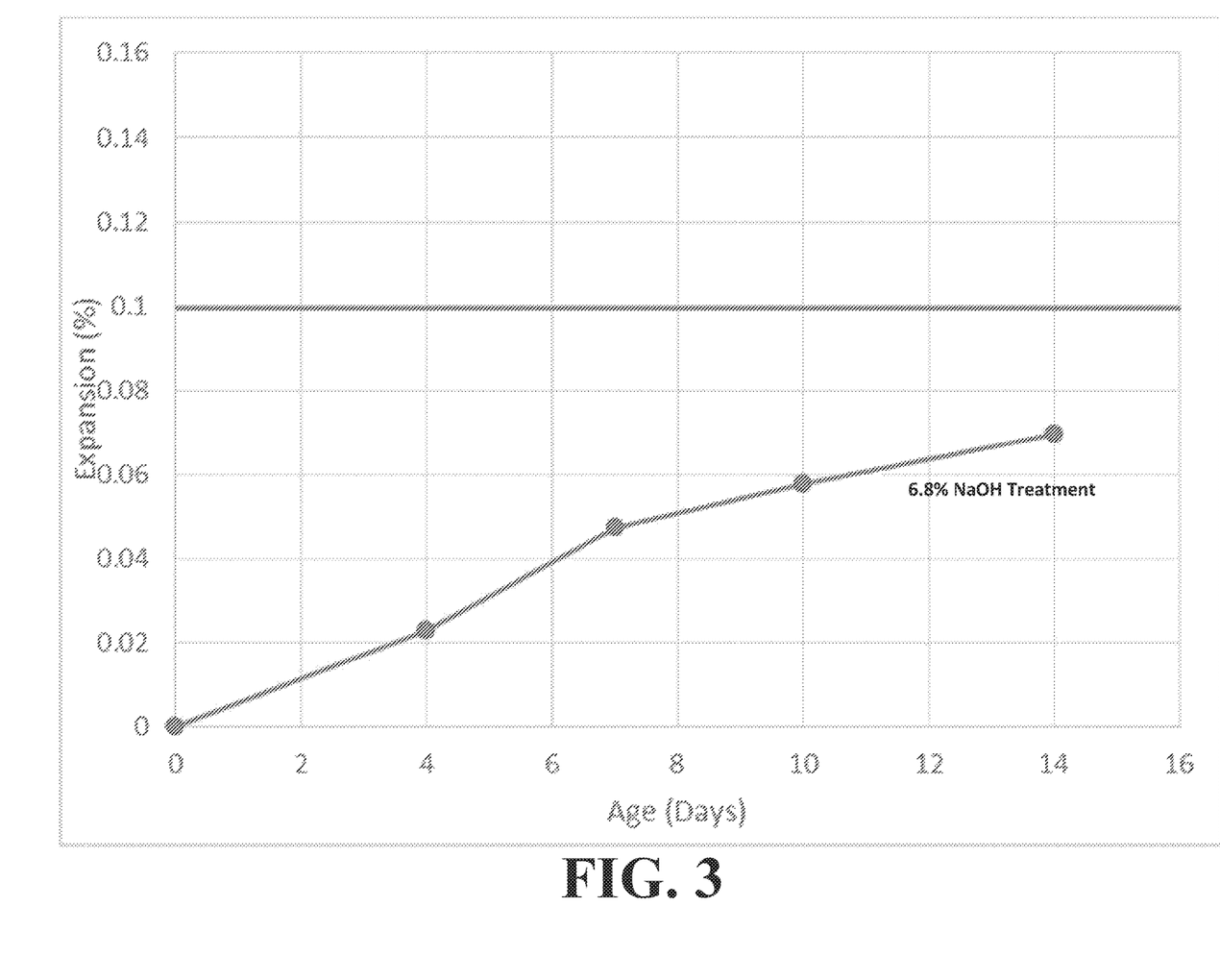
FIG. 3 shows expansion characteristics of treated aggregates, as discussed in Example 2.

As described previously, high calcium fly ash may be used in an aggregate to limit the ASR risk of concrete produced with the aggregate. A given aggregate is considered not susceptible to ASR when tested according to ASTM C1260, if it expands less than 0.10% in 14 days according to ASTM C1778. If an aggregate expands greater than or equal to 0.10% in 14 days according to ASTM C1778, the aggregate may be considered susceptible to ASR. Aggregates were treated in a 6.8 wt. % NaOH solution at 60° C. for two hours and tested according to ASTM C1260. A plot of the expansion measurements taken over time is shown in FIG. 3, along with a reference line for ASR susceptibility at 0.1%. Aggregates with expansion values above 0.1% are considered to be potentially susceptible to ASR, while aggregates with expansion values below 0.1% are considered to be not prone to ASR. As indicated by the expansion measurements, the treated aggregates were not prone to ASR.

Example 3

A sample of aggregates, graded according to ASTM C1260, were treated in a 3.5 wt. % NaOH solution at 60° C. for 72 hours. The treated aggregates were then mixed with aggregates from the Spratt quarry in Ontario, Calif. Spratt quarry aggregates are known for their susceptibility to ASR. Without being limited by theory, it is believed that the susceptibility to ASR may be the result of opaline chert, volcanic glass, or strained quartz within the mineral structure of Spratt quarry aggregates. The treated aggregates and the Spratt quarry aggregates were mixed in varying ratios and expansion was measured after 14 days, according to ASTM C1260. Control samples were prepared with non-reactive alluvial river aggregates in place of the treated aggregates for comparison. The treated aggregates were found to mitigate the expansion caused by the ASR-prone aggregates. This is indicated by the data in Table 6 below.

TABLE 6

| Wt. % ASR Prone Aggregate | Wt. % Treated Aggregate | Wt. % Non-reactive ASR (control) | Expansion at 14 days |
| --- | --- | --- | --- |
| 100 | 0 | — | 0.38 |
| 85 | 15 | — | 0.19 |

TABLE 5

| Grade | Treatment | Initial Weight (g) | Weight after 500 Rev. (g) | Weight loss before washing (%) | Weight loss after washing (%) | Effective Weight Loss (%) | Maximum Allowance (%) | ASTM C33 Specification |
| --- | --- | --- | --- | --- | --- | --- | --- | --- |
| A | Untreated | 5000 | 1326 | 73 | 1303 | 74 | 50 | FAIL |
|   | A1 | 5000 | 3465 | 31 | 3436 | 31 | 50 | PASS |
| C | Untreated | 5000 | 1903 | 62 | 1873 | 63 | 50 | FAIL |
|   | Water at 60°; 72 hrs | 5000 | 4289 | 14 | 2537 | 49 | 50 | PASS |
|   | C1 | 5000 | 3358 | 33 | 3326 | 33 | 50 | PASS |
|   | C2 | 5000 | 3961 | 21 | 3816 | 24 | 50 | PASS |
|   | C3 | 5000 | 2669 | 47 | 2640 | 47 | 50 | PASS |
| D | Untreated | 5000 | 2051 | 59 | 2022 | 60 | 50 | FAIL |
|   | D2 | 5000 | 3823 | 24 | 3782 | 24 | 50 | PASS |
|   | D3 | 5000 | 4253 | 15 | 4186 | 16 | 50 | PASS |

TABLE 6-continued

| Wt. % ASR Prone Aggregate | Wt. % Treated Aggregate | Wt. % Non-reactive ASR (control) | Expansion at 14 days |
|---|---|---|---|
| 70 | 30 | — | 0.14 |
| 50 | 50 | — | 0.12 |
| 0 | 100 | 0 | 0.07 |
| 85 | — | 15 | 0.36 |
| 70 | — | 30 | 0.38 |
| 50 | — | 50 | 0.36 |
| 0 | — | 100 | 0.14 |

The data in Table 6 shows that by replacing 15 wt. %, 30 wt. %, and 50 wt. % of aggregate prone to ASR with treated aggregate resulted in expansion reductions of 24%, 45%, and 68%, respectively.

Example 4

A sample of fluidized bed ash aggregates was treated with 7 wt. % NaOH at 60° C. for 72 hours. The chemical composition of the sample before and after treatment was analyzed by XRF, and abrasion resistance of the two materials was tested by ASTM C131 (LA abrasion test). The results are summarized in Table 7.

TABLE 7

| | | Untreated | Treated |
|---|---|---|---|
| Chemical Composition (wt. %) | $SiO_2$ | 35.20 | 37.84 |
| | $Al_2O_3$ | 11.09 | 11.61 |
| | $Fe_2O_3$ | 4.65 | 4.66 |
| | Sum of Si, Al, & Fe Oxides | 50.95 | 54.12 |
| | $SO_3$ | 10.85 | 6.80 |
| | CaO | 27.62 | 26.26 |
| | $Na_2O$ | 2.40 | 5.03 |
| | MgO | 3.38 | 3.37 |
| | $K_2O$ | 1.50 | 1.40 |
| | NaOH Uptake | N/A | 3.39 |
| | Property | Untreated | Treated |
| ASTM C131 | Initial Weight (g) | 5000 | 5000 |
| | Weight after 500 Rev. (g) | 1279 | 1760 |
| | Weight loss before washing (%) | 71 | 57 |
| | Weight after washing (g) | 1278 | 1459 |
| | Effective weight loss (%) | 71 | 57 |

As can be seen in Table 7, the untreated aggregate lost 71% of its mass while the treated aggregate only lost 57% of its mass. This indicates that the treated aggregate exhibited improved abrasion resistance as compared to the untreated aggregate.

Additional embodiments may be devised without departing from the basic scope thereof, and the scope thereof is determined by the claims that follow.

What is claimed is:

1. Aggregates comprising fly ash and an inorganic polymer binder, wherein the aggregates comprise calcium, potassium, sodium, lithium, or combinations thereof, wherein the aggregates comprise a fly ash core at least partially covered by a layer of the inorganic polymer binder having a thickness greater than or equal to 0.75 mm.

2. The aggregates of claim 1, wherein the aggregates comprise calcium and at least one of potassium, sodium, or lithium.

3. The aggregates of claim 1, wherein the aggregates comprise $CaAl_2Si_2O_8$, $NaAl_2Si_2O_8$, $(Ca,Na)Al_2Si_2O_8$, or combinations thereof.

4. The aggregates of claim 1, wherein the inorganic polymeric binder is present in the aggregates in an amount greater than or equal to 2.0 wt. % with respect to the total weight of the aggregates.

5. The aggregates of claim 1, wherein the aggregates have an average particle size of 2 mm to 25 mm.

6. The aggregates of claim 1, wherein the inorganic polymer binder comprises a geopolymer.

7. The aggregates of claim 1, wherein the aggregates expand less than or equal to 0.10% over 16 days, as measured by ASTM C1260 and/or the aggregates meet the specifications for concrete aggregates under ASTM C33 (% maximum allowance of weight loss), as measured by ASTM C131.

8. A concrete mixture comprising:
aggregates comprising fly ash and an inorganic polymer binder, wherein the aggregates comprise calcium, potassium, sodium, lithium, or combinations thereof; and
a hydraulic cement, wherein the hydraulic cement comprises fly ash, and a weight ratio of the aggregates to the fly ash is 5:1 to 1:1.

9. The concrete mixture of claim 8, wherein the aggregates are present in the concrete mixture in an amount of 35 wt. % to 90 wt. % with respect to the total weight of the concrete mixture.

10. The concrete mixture of claim 8, wherein the hydraulic cement further comprises at least one of ordinary Portland cement, ground bottom ash, cements containing natural pozzolans, ground-granulated blast furnace slag, silica fume, or combinations thereof.

11. A method of preparing aggregates comprising contacting fly ash agglomerates with an alkaline solution comprising NaOH, KOH, LiOH, or a salt of an organic acid, wherein the fly ash agglomerates have an average particle size of 2 mm to 25 mm.

12. The method of claim 11, wherein the fly ash agglomerates comprise greater than or equal to 5 wt. % CaO.

13. The method of claim 11, wherein the alkaline solution comprises from 1 wt. % to 50 wt. % of one or more alkali metal hydroxides.

14. The method of claim 11, wherein the fly ash agglomerates are contacted with the alkaline solution at a temperature greater than or equal to 25° C.

15. The method of claim 11, further comprising hydrating the fly ash agglomerates before contacting the fly ash agglomerates with the alkaline solution.

16. The method of claim 11, further comprising, after contacting the fly ash agglomerates with the alkaline solution:
recovering the alkaline solution; and
adjusting a concentration of the recovered alkaline solution.

17. A method of preparing aggregates for a concrete mixture, the method comprising:
hydrating fly ash agglomerates having an average particle size of 2 mm to 25 mm; and
contacting the hydrated fly ash agglomerates with an alkaline solution comprising NaOH, KOH, LiOH, or a salt of an organic acid to thereby produce the aggregates.

18. The method of claim 17, wherein the contacting the fly ash agglomerates with the alkaline solution includes submerging the fly ash agglomerates in the alkaline solution at a temperature greater than or equal to 25° C.

19. The method of claim 17, wherein the hydrated fly ash agglomerates comprise greater than or equal to 5 wt. % CaO.

* * * * *